(12) United States Patent
Jugl et al.

(10) Patent No.: US 7,530,630 B2
(45) Date of Patent: May 12, 2009

(54) ROLLER BLIND SYSTEM FOR A SLIDING ROOF

(75) Inventors: Michael Jugl, Sulzbach (DE); Christian Biewer, Altheim (DE); Horst Boehm, Frankfurt am Main (DE)

(73) Assignee: ArvinMeritor Technology, LLC, Troy, MI (US)

( * ) Notice: Subject to any disclaimer, the term of this patent is extended or adjusted under 35 U.S.C. 154(b) by 27 days.

(21) Appl. No.: 11/836,435

(22) Filed: Aug. 9, 2007

(65) Prior Publication Data

US 2008/0061605 A1 Mar. 13, 2008

(51) Int. Cl.
*B60J 7/043* (2006.01)
(52) U.S. Cl. .................. 296/214; 160/271; 160/272
(58) Field of Classification Search .......... 296/214, 296/141; 160/271, 272, 273.1
See application file for complete search history.

(56) References Cited

U.S. PATENT DOCUMENTS

| 4,707,018 | A | * | 11/1987 | Gavagan ............... 296/152 |
| 6,047,762 | A | * | 4/2000 | Anderson ............ 160/370.22 |
| 6,119,758 | A | * | 9/2000 | Coenraets ............. 160/273.1 |
| 2005/0225122 | A1 | | 10/2005 | Becher et al. |

FOREIGN PATENT DOCUMENTS

EP        1584509       10/2005
WO    2006053520        5/2006

OTHER PUBLICATIONS

European Search Report Dated Feb. 1, 2007.

* cited by examiner

*Primary Examiner*—Dennis H Pedder
(74) *Attorney, Agent, or Firm*—Carlson, Gaskey & Olds PC

(57) ABSTRACT

A roller blind system for a sliding roof includes a guide rail and a spring steel band that is guided in the guide rail in sections. The spring steel band has an end that is situated outside the guide rail, and which contracts to a coil. A roller blind is attached to the spring steel band, and a compensation spring is provided.

14 Claims, 5 Drawing Sheets

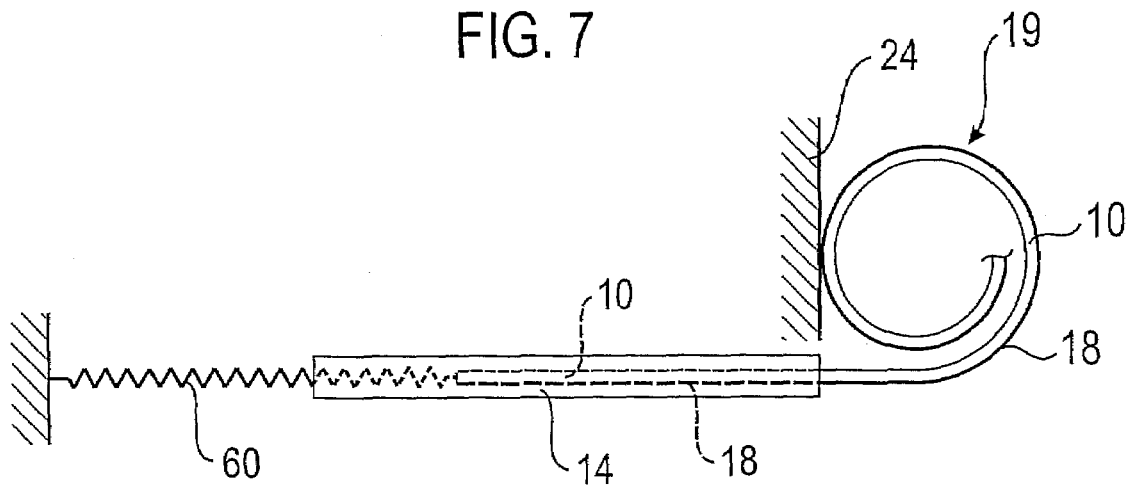
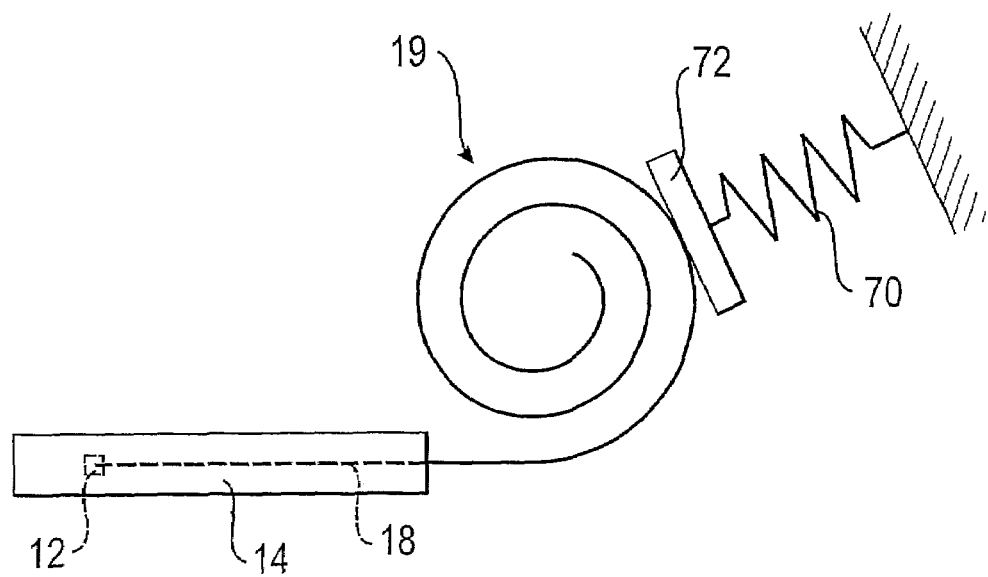

ROLLER BLIND SYSTEM FOR A SLIDING ROOF

RELATED APPLICATIONS

The application claims priority to European Patent Application No. 06 019 140.0, which was filed on Sep. 13, 2006.

BACKGROUND OF THE INVENTION

The invention relates to a roller blind system for a sliding roof. The roller blind system includes a guide rail, a spring steel band that is guided in the guide rail in sections, and a roller blind that is attached to the spring steel band. The spring steel band has an end that is situated outside the guide rail and contracts to a coil.

A roller blind system of this type is known from EP 1 584 509 A2. The advantage of this roller blind system is that it is very compact. The spring steel band serves to fasten the roller blind and also acts as a return spring. It has turned out, however, that operational forces required for shifting the roller blind in the guide rail change depending on the shifting direction. When the roller blind is moved towards a more closed position, i.e. is extracted, higher operating forces are required than for moving back and winding up the roller blind for a more open condition. In addition, it has turned out that operating forces, when the roller blind is moved toward a more closed position, become larger with an increasing extraction length of the roller blind. Different and/or changing operating forces generally are perceived by a user as an annoyance.

It is the object of the invention to further develop a roller blind system of the type initially mentioned that generates more consistent operating forces.

SUMMARY OF THE INVENTION

In order to solve this problem, a compensation spring is provided according to the invention. The invention is based on the fundamental idea to provide—in addition to a coil that exerts a return force on the roller blind—another spring that exerts a spring force, which acts in addition to the return force. The two forces superimpose each other such that more constant operating forces are provided.

According to one embodiment of the invention, the compensation spring is constituted by an auxiliary coil made up of the spring steel band that comprises a roller blind coil. The auxiliary coil is arranged on a side of a guide rail that is opposite the roller blind coil. In this arrangement, the spring steel band is realized with such a length that the spring steel band runs starting from the roller blind coil, through the guide rail, and beyond the latter, so that a free end curves to form the auxiliary coil. As the roller blind is shifted to a more closed position, the roller blind coil will become smaller, while the auxiliary coil becomes larger, and vice versa. The return forces that are exerted by the two coils cancel each other in large part, so that during shifting of the roller blind only frictional forces will have to be overcome, essentially induced by the spring steel band and the roller blind in the guide rail.

According to a further embodiment of the invention, the compensation spring acts on the spring steel band in a longitudinal direction of the guide rail. In this embodiment, the compensation spring, which may be a tension spring similar to the auxiliary coil, exerts a force on the roller blind that is opposed to the return force exerted by the roller blind coil.

According to a still further embodiment of the invention, the compensation spring acts on the roller blind coil. This makes it possible to exert a frictional force on the roller blind coil that is dependent on a diameter of the roller blind coil, so that operating forces are obtained in total which minimizes variance during shifting of the roller blind.

Advantageous embodiments of the invention will be apparent from the sub-claims.

These and other features of the present invention can be best understood from the following specification and drawings, the following of which is a brief description.

BRIEF DESCRIPTION OF THE DRAWINGS

FIG. 7 shows a roller blind system according to a second embodiment in a schematic side view.

FIG. 8 shows a roller blind system according to a third embodiment in a schematic side view.

DETAILED DESCRIPTION OF THE PREFERRED EMBODIMENT

Figure 1:
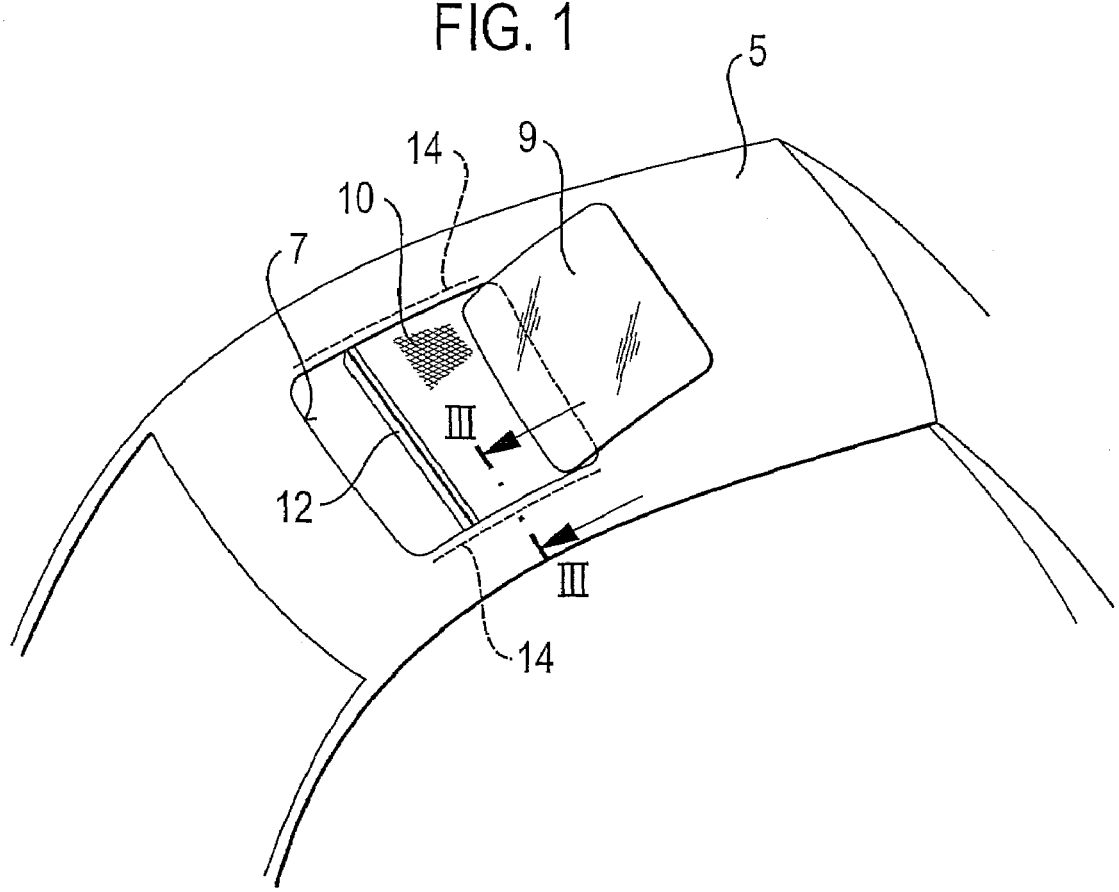
FIG. 1 is a perspective view of a vehicle roof comprising a roller blind.
Figure 2:
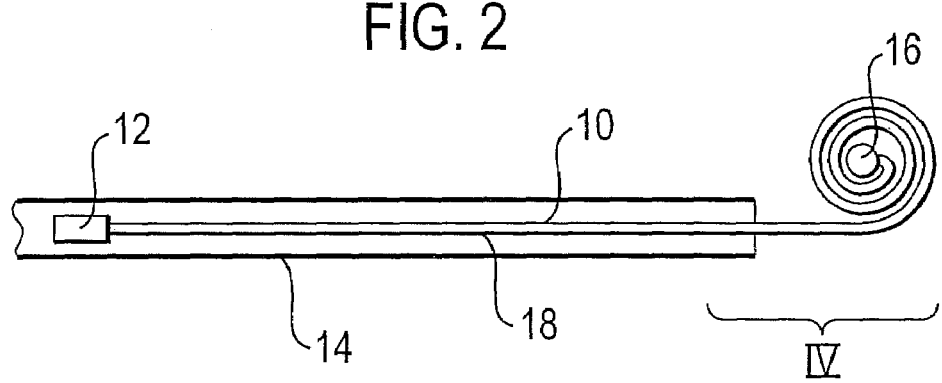
FIG. 2 is a schematic side view of a roller blind as it is known from the initially mentioned EP 1 584 509 A2.
Figure 3:
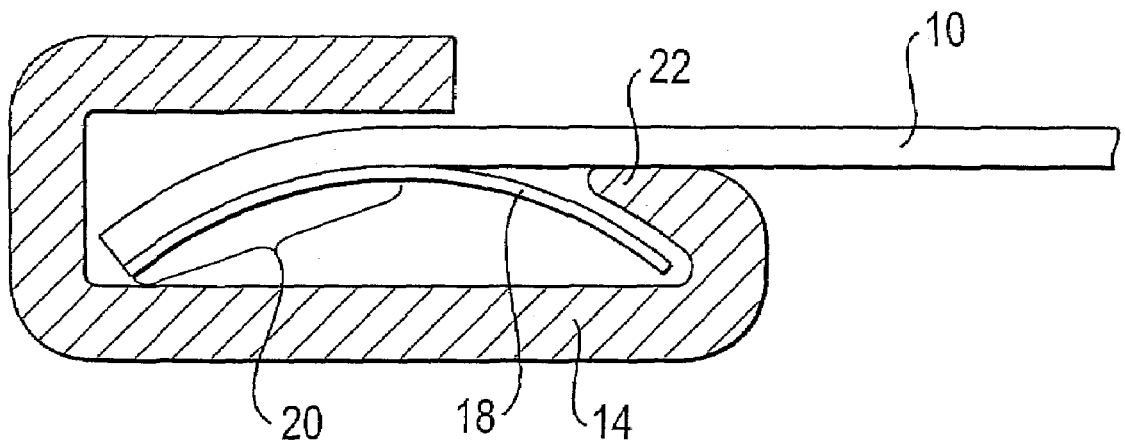
FIG. 3 shows a section along plane III-III of FIG. 1.

In FIG. 1 a vehicle roof 5 is shown with an opening 7. Associated with the opening 7 is a cover 9 of a sliding roof system. The cover 9 can be shifted between a closed position in which the cover closes the opening 7, and an opened position shown in FIG. 1. Arranged underneath the cover 9 and also underneath the opening 7 is a roller blind 10 that is part of a roller blind system. Relating to the vehicle, the roller blind 10 can be shifted to the front and to the rear. When the roller blind 10 has been fully moved to the rear, the opening 7 is completely exposed. Fresh air and sunlight can then freely enter a vehicle interior space. When the roller blind 10 has been fully moved to the front, the opening 7 is covered by the roller blind 10. Thus, fresh air and sunlight can enter the vehicle interior space only to a limited extent.

The roller blind 10 is made of a flexible material, for instance of fabric or a plastic film. Provided on a front edge is a roof stick 12 that can be grasped by a vehicle occupant in order to move the roller blind 10 to the front or rear. Two guide rails 14 extend along lateral edges of the opening 7 in a longitudinal direction of the vehicle, and are part of the roller blind system. The guide rails 14 receive the two longitudinal edges of the roller blind 10, i.e. right and left edges of the roller blind 10 as seen in the longitudinal direction of the vehicle. Situated in a region of a rear end of the opening 7, is a rear edge of the roller blind 10 to which a winding body 16 is attached. The winding body 16 is not supported on the vehicle roof 5; it may be implemented as a plastic ledge that is applied on the rear edge of the roller blind 10 by injection-molding and essentially has the function to hold the rear edge of the roller blind 10 taut in a direction transverse to the longitudinal direction of the vehicle. The roller blind system can operate without any winding body as well; in this case the roller blind 10 winds up freely between spring steel bands, when these leave the guide rails 14.

Provided along the longitudinal edges of the roller blind 10, i.e. in the region which is associated to the guide rails 14, is one spring steel band 18 each. The spring steel band 18 is configured such that the spring steel band 18 will coil up to form a spiral when it is not held elongated in the guide rails 14.

The roller blind 10 is glued to the spring steel bands 18 or connected in any other suitable manner.

Figure 4:
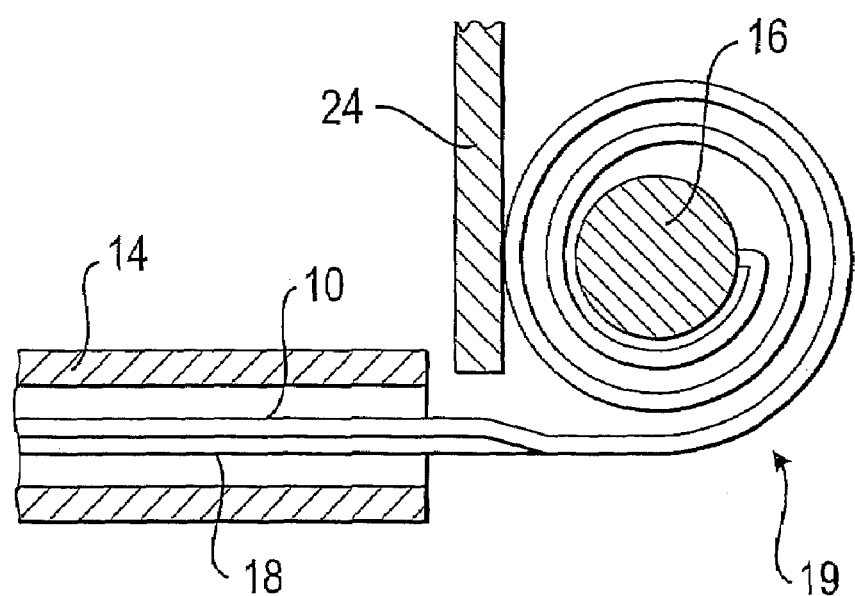
FIG. 4 shows, on an enlarged scale, the detail IV of FIG. 2.

When the roller blind 10 is moved to the rear to expose the opening 7, the rear region of the roller blind 10 is moved out of the guide rails 14. In this process, the roller blind 10 will be automatically rolled up into a roller blind coil 19 by the spring steel bands 18 (see in particular FIG. 4). The coil 19 is tautly tensioned due to the pretension of the spring steel bands 18 and because of the winding body 16. The roller blind coil 19 rests at a wall 24 which delimits an accommodation space for the coiled-up roller blind 10.

A first embodiment of the roller blind system according to the invention will now be described on the basis of FIGS. 5 and 6. The same reference numerals will be used for the components which are known from FIGS. 1 to 4, and reference is made to the above explanations.

Figure 5:
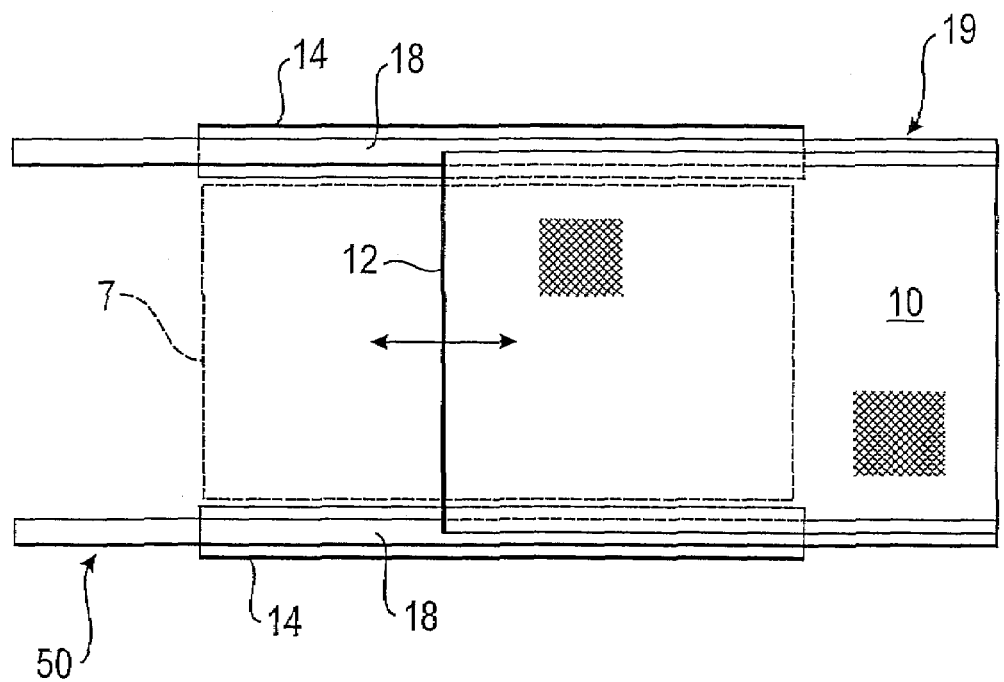
FIG. 5 shows a roller blind system according to a first embodiment of the invention in a schematic top view.
Figure 6:
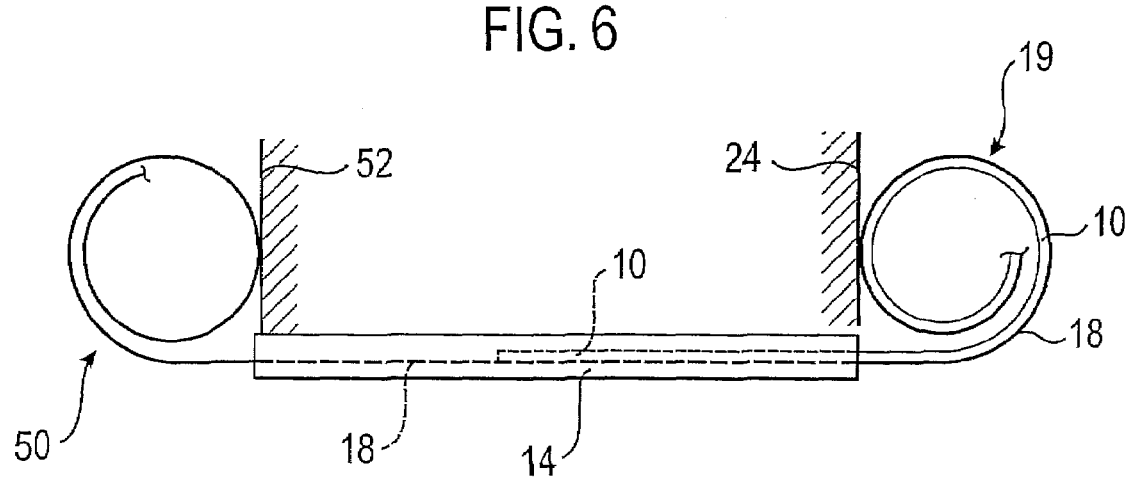
FIG. 6 shows the roller blind system of FIG. 5 in a schematic side view.

The embodiment according to FIGS. 5 and 6 is distinguished in that the spring steel bands 18 are extended beyond a front end of the roller blind 10 and a front end of the guide rails 14, so that an auxiliary coil 50 forms on that side of each guide rail 14 which is opposite the roller blind coil 19. Generally spoken, this auxiliary coil 50 is a mirror image of the roller blind coil 19 (see also auxiliary wall 52), with the difference that the roller blind 10 never can be in a region of the auxiliary coil 50; even if the roller blind 10 is completely closed, a front edge of the roller blind 10 lies between the guide rails 14 and, hence, is not in the region of the auxiliary coil 50. The two spring steel bands 18 are realized with such a length that, even with a roller blind 10 coiled up to the maximum, a small auxiliary coil 50 will remain in front of the guide rails 14.

Each auxiliary coil 50 acts as a compensation spring, because the auxiliary coil 50 generates a force which opposes a return force of the roller blind coil 19. As such, the roller blind can be moved in both shifting directions with approximately the same operating force.

A further advantage of the first embodiment is that, due to the length of the spring steel bands 18, the risk is minimized that the two spring steel bands 18 are unequally shifted in the guide rails 14; the roof stick 12 always extends generally perpendicular to the guide rails 14.

For reasons of assembly, each spring steel band 18 can be realized in two pieces. In one example, a front section and a rear section are connected with each other in a region of the roof stick 12.

A second embodiment of the roller blind system according to the invention will now be explained on the basis of FIG. 7. The same reference numerals will be used for the components which are known from the preceding figures, and reference is made to the above explanations.

In place of the auxiliary coil 50, a compensation spring 60 is used in the second embodiment, which is configured as a tension spring. One end of the compensation spring 60 is immovably attached, and another end of the compensation spring 60 is attached to a front end of the spring steel band 18, for instance in the region of the roof stick 12.

The compensation spring 60 generates a force that opposes the return force of the roller blind coil 19, so that the roller blind 10 can be moved in both shifting directions with approximately the same operating force.

A third embodiment of the roller blind system according to the invention will now be explained on the basis of FIGS. 8 and 9. The same reference numerals will be used for the components which are known from the preceding figures, and reference is made to the above explanations.

Like in the roller blind system illustrated in FIGS. 1 to 4, only one roller blind coil 19 is used in the third embodiment; the front end (for instance on the roof stick 12) of the spring steel band 18 is not engaged by a spring. A compensation spring 70 is provided instead, which is configured as a compression spring. This compression spring acts on a friction element 72 which presses the roller blind coil 19 in the nature of a brake. An end of the compensation spring 70 facing away from the friction element 72 is statically supported.

The compensation spring 70 is dimensioned such that the braking force, exerted by the compensation spring 70 in conjunction with the friction element 72, reduces (owing to a reduction in pretension of the compensation spring 70) when the diameter of the roller blind coil 19 becomes smaller. As the return force of the roller blind coil 19 increases when the diameter of the roller blind coil 19 decreases, a return force will arise, which is nearly constant and independent of the position of the roller blind 10 in the guide rail 14, and which has to be applied by the user in order to shift the roller blind 10 in either direction.

Figure 9:
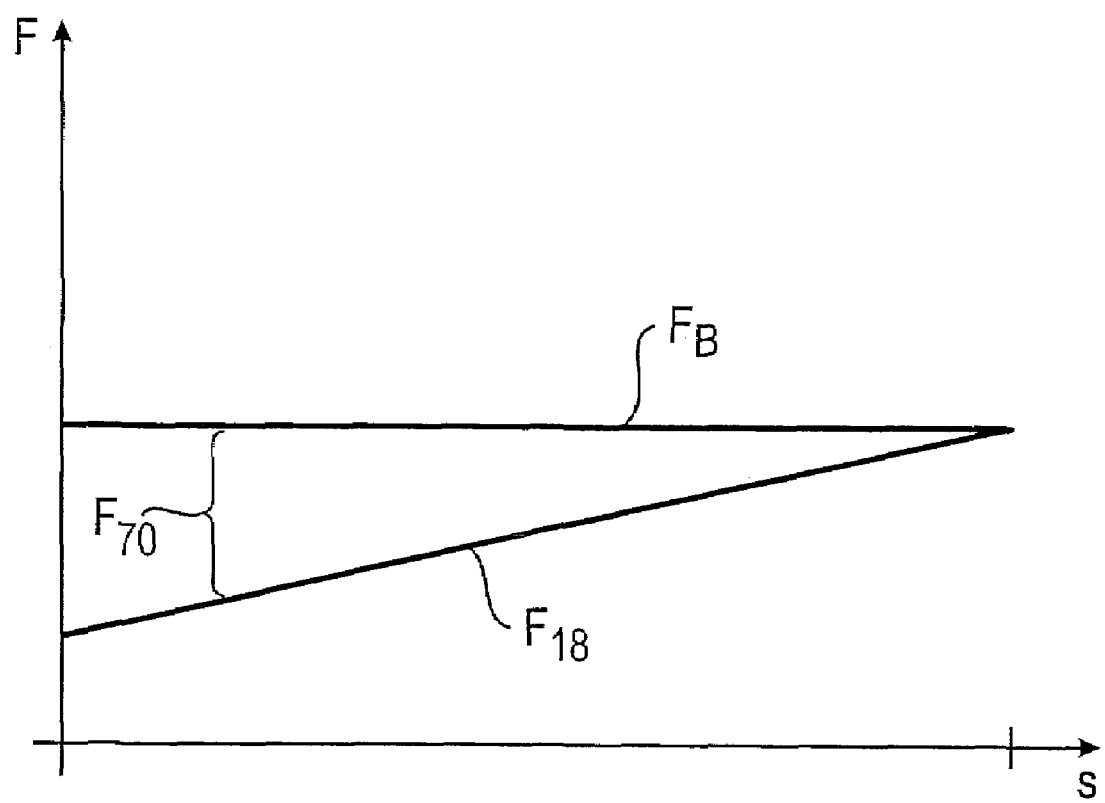
FIG. 9 is a diagram of extraction forces of the roller blind as a function of a length of an extracted roller blind.

FIG. 9 illustrates the return force $F_{18}$ that is generated by the spring steel bands 18, and the braking force $F_{70}$ that is generated by the compensation spring 70. It can be seen that the forces, as observed across the shifting path s of the roller blind 10, behave contrarily; when the return force $F_{18}$ decreases, the braking force $F_{70}$ increases. In total, a nearly constant operating force $F_B$ arises.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A roller blind system for a sliding roof comprising:
   a guide rail;
   a spring steel band that is guided in the guide rail in sections in a longitudinal direction of the guide rail, the spring steel band having an end that is situated outside the guide rail and which contracts to a coil;
   a roller blind that is attached directly to the spring steel band; and
   a compensation spring.

2. The roller blind system according to claim 1, wherein the compensation spring acts on the coil.

3. The roller blind system according to claim 2, wherein the compensation spring exerts a frictional force on the coil that is dependent on a diameter of the coil.

4. The roller blind system according to claim 1, wherein the compensation spring acts on the spring steel band in a longitudinal direction of the guide rail.

5. The roller blind system according to claim 4, wherein the compensation spring is a tension spring.

6. A roller blind system for a sliding roof comprising:
   a guide rail;
   a spring steel band that is guided in the guide rail in sections, the spring steel band having an end that is situated outside the guide rail and which contracts to a coil;
   a roller blind that is attached to the spring steel band; and a compensation spring constituted by an auxiliary coil made up of the spring steel band, and with the auxiliary coil being arranged on a side of the guide rail that is opposite the coil.

7. The roller blind system according to claim 6, wherein the spring steel band extends through the guide rail.

8. The roller blind system according to claim 1, wherein the roller blind includes longitudinal edges that extend in the longitudinal direction defined by the guide rail, and wherein one longitudinal edge of the roller blind is received within the guide rail.

9. The roller blind system according to claim 8, wherein the spring steel band is provided along the longitudinal edge of the roller blind.

10. A roller blind system for a sliding roof comprising:
at least one guide rail extending in a longitudinal direction;
a spring steel band that is guided in the at least one guide rail, the spring steel band having an end that is situated outside the at least one guide rail and which contracts to a coil;
a roller blind having longitudinally extending edges, and wherein the spring steel band is provided at least at one of the longitudinally extending edges of the roller blind; and
a compensation spring.

11. The roller blind system according to claim 10 wherein the at least one guide rail comprises first and second guide rails each extending in the longitudinal direction and being laterally spaced apart from each other, and wherein the spring steel band is provided at the one of the longitudinally extending edges of the roller blind and including another spring steel band provided at the other of the longitudinally extending edges such that each of the first and second guide rails guides one of the spring steel bands.

12. The roller blind system according to claim 10 wherein the spring steel band is directly attached to the one of the longitudinally extending edges of the roller blind.

13. The roller blind system according to claim 10 wherein the roller blind is movable between a coiled position and an uncoiled position, and wherein the spring steel band is in direct abutting contact with the roller blind within the coil of the spring steel band when the roller blind is in the coiled position.

14. The roller blind system according to claim 10 wherein the coil of the spring steel band is at one of a front or rear end of the roller blind, and wherein the spring steel band extends beyond the other of the front or rear end of the roller blind to form an auxiliary coil, the auxiliary coil acting as the compensation spring to generate a force that opposes a return force of the coil.

* * * * *

UNITED STATES PATENT AND TRADEMARK OFFICE
CERTIFICATE OF CORRECTION

PATENT NO.         : 7,530,630 B2
APPLICATION NO. : 11/836435
DATED              : May 12, 2009
INVENTOR(S)       : Michael Jugl et al.

It is certified that error appears in the above-identified patent and that said Letters Patent is hereby corrected as shown below:

On the Title Page:

The Assignee should read as follows:

(73) Assignee: ArvinMeritor GmbH, Dietzenbach, Germany

Signed and Sealed this

First Day of December, 2009

David J. Kappos
*Director of the United States Patent and Trademark Office*